May 11, 1948. F. M. JONES Re. 23,000

REMOVABLE COOLING UNIT FOR COMPARTMENTS

Original Filed July 30, 1941 6 Sheets-Sheet 1

Inventor
F. M. Jones
By R. W. Whitely
Attorney

REMOVABLE COOLING UNIT FOR COMPARTMENTS

Original Filed July 30, 1941 6 Sheets-Sheet 2

Inventor:
F. M. Jones.
By
P. D. Whiteley
Attorney.

May 11, 1948. F. M. JONES Re. 23,000
REMOVABLE COOLING UNIT FOR COMPARTMENTS
Original Filed July 30, 1941 6 Sheets-Sheet 3
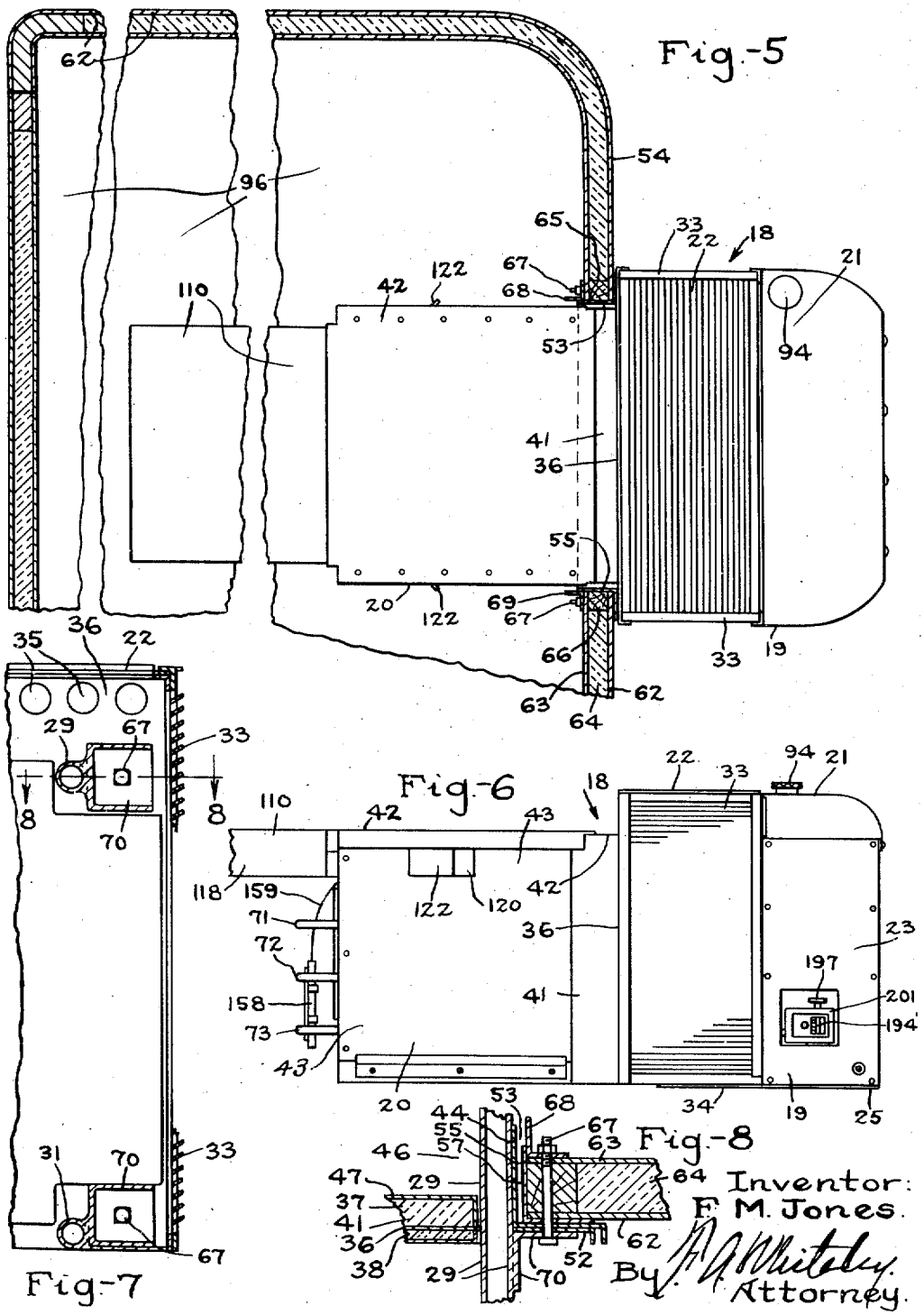

May 11, 1948. F. M. JONES Re. 23,000
REMOVABLE COOLING UNIT FOR COMPARTMENTS
Original Filed July 30, 1941 6 Sheets-Sheet 4
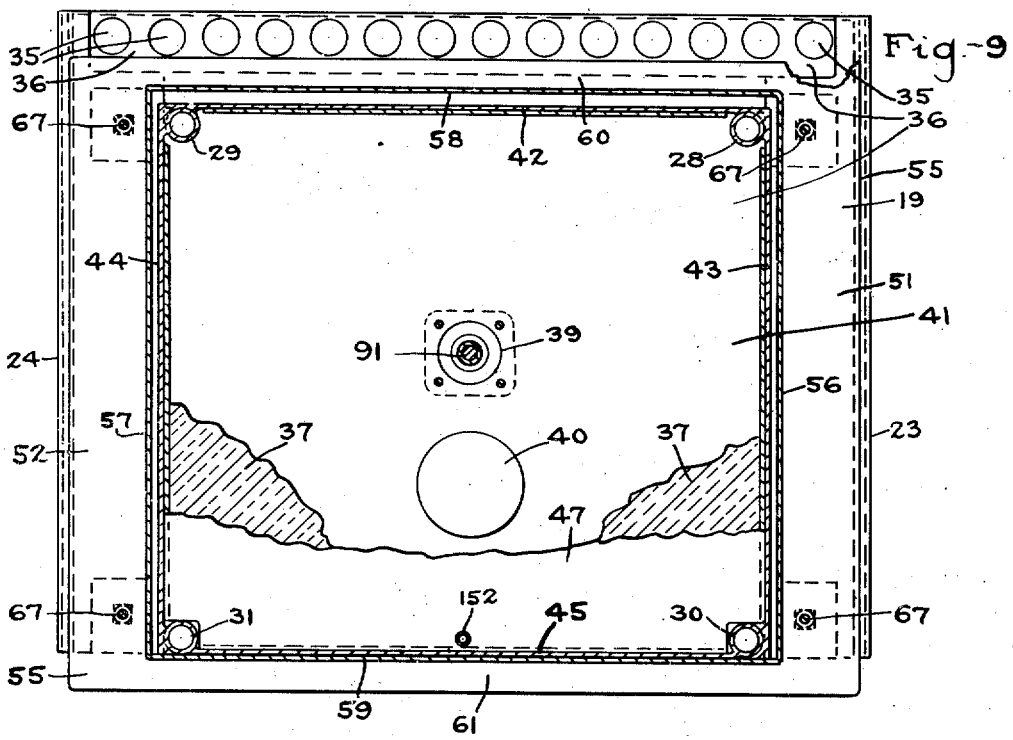
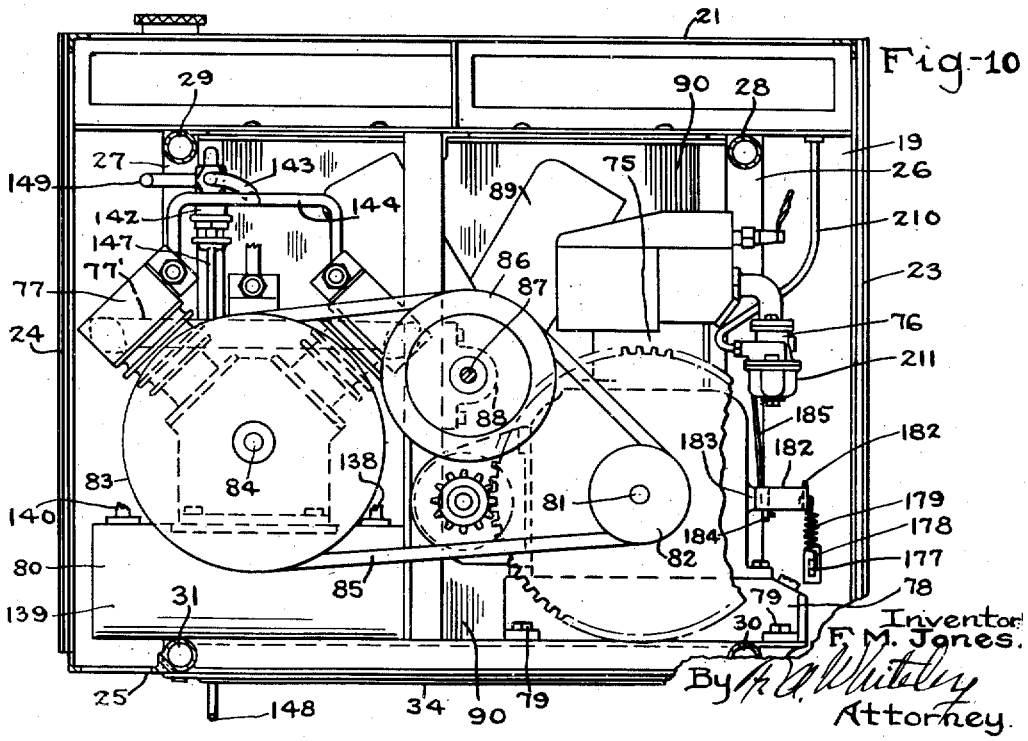

May 11, 1948. F. M. JONES Re. 23,000

REMOVABLE COOLING UNIT FOR COMPARTMENTS

Original Filed July 30, 1941 6 Sheets-Sheet 5

Inventor:
F. M. Jones.
By F. M. Whitely
Attorney.

REMOVABLE COOLING UNIT FOR COMPARTMENTS
Original Filed July 30, 1941 6 Sheets-Sheet 6
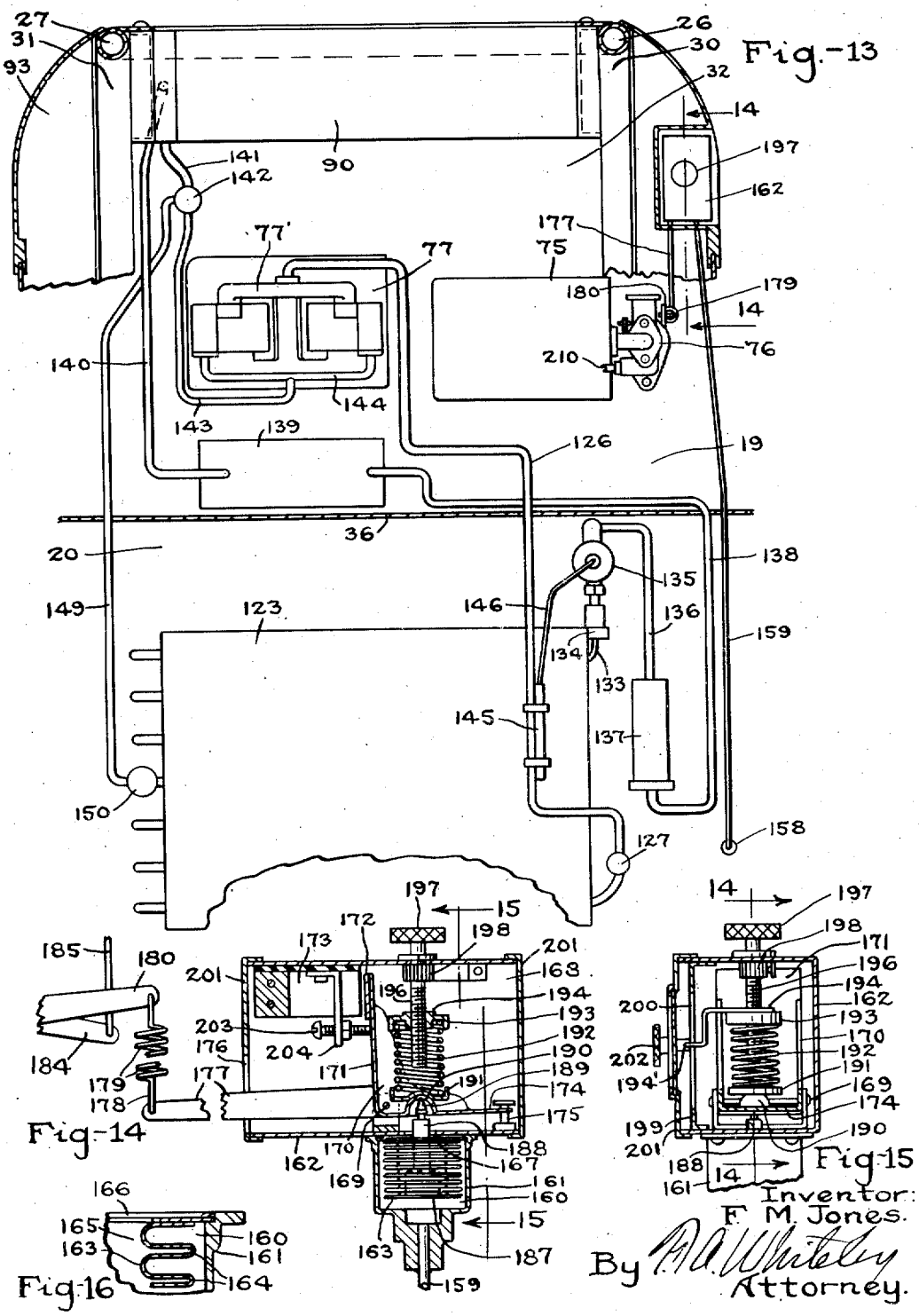

Reissued May 11, 1948 Re. 23,000

UNITED STATES PATENT OFFICE 23,000

REMOVABLE COOLING UNIT FOR COMPARTMENTS

Frederick M. Jones, Minneapolis, Minn., assignor to The U. S. Thermo Control Co., Minneapolis, Minn., a corporation of Minnesota Original No. 2,336,735, dated December 14, 1943, Serial No. 404,596, July 30, 1941. Application for reissue January 6, 1947, Serial No. 720,464

4 Claims. (Cl. 62—117)

My invention relates to a removable cooling unit for compartments of trucks, railroad cars and the like employed in transporting perishables and to a method of cooling such compartments, and has for its object to provide a simple and compact self-contained cooling unit positioned at the top and at the front end of said compartment.

Perishables such as meats, vegetables, fruits and the like are transported in what are known as refrigerator cars by rail and, to a greatly increasing degree at the present time, in trucks and truck trailers. This transportation, taking place as it does over long routes which in the summer time are at high temperatures throughout and even in the winter time may be in part at high temperatures and in part at freezing temperatures, requires artificial cooling or heating in order to preserve said perishables in suitable condition for use as food.

In the case of refrigerator railroad cars, heavy cooling means such as large ice compartments or large and heavy refrigerating plants can be practically employed. This is not true of trucks and trailers, where the necessary limitations of their use call for cooling means of relatively low weight and so positioned as to take up little as possible of the space within the transporting compartment.

It is a principal object of my invention, therefore, to provide a cooling unit small in size and weight, and positioned, together with the air-conducting passages, so as to occupy substantially none of the storage space within the vehicle compartment.

It is a further object of my invention to provide a unit which shall be mounted in the front wall of the compartment partly outside and partly inside and having its top adjacent the top wall of the compartment.

It is a further and particular object of my invention to provide a cooling unit embodying a single unitary casing wherein is mounted all of the instrumentalities, including the power unit, for producing necessary movements of air and means for cooling or otherwise conditioning said air and means for controlling and operating the several instrumentalities.

It is a further object of my invention to provide a unit embodied in such a casing wherein the heating parts of the unit or the parts of the unit which normally give off heat are located outside of the compartment to be cooled and the cooling part of the unit or the part which may deliver cooled air is located inside of the compartment.

It is a further object of my invention to provide for operating the air conditioning instrumentalities a gas engine power plant and to provide means for controlling operation of said gas engine operated by an expansion thermostat for causing said controlling means to effect control of operation of the gas engine in response to changes of temperature of the air about said thermostat.

The full objects and advantages of my invention will appear in connection with the detailed description which will now be given, and the novel features by which the above noted advantageous results are obtained will be particularly pointed out in the claims.

In the drawings illustrating an application of my invention in one form:

Fig. 5 is a top plan view of the entire unit as positioned in a food compartment with the top wall of said compartment removed.

Fig. 6 is a side elevation view of the entire unit as it appears when not associated with the front wall of the food compartment.

Fig. 7 is a sectional elevation view through one wall of the unit taken on line 7—7 of Fig. 1.

Fig. 8 is a fragmentary sectional view taken on line 8—8 of Fig. 7.

Fig. 9 is a transverse sectional view taken on line 9—9 of Fig. 1 and viewed in the direction of the arrows.

Fig. 10 is a transverse sectional view taken on line 10—10 of Fig. 1.

Fig. 13 is a diagrammatic plan view showing the relation of the different operating parts to each other and to the chambers forming the unit.

Fig. 14 is a sectional elevation view of the thermostatic carburetor control taken on line 14—14 of Figs. 13 and 15.

Fig. 15 is a sectional view of the carburetor control mechanism taken on line 15—15 of Fig. 14.

Fig. 16 is an enlarged fragmentary sectional view through a corner of the casing and carburetor control mechanism and fluid expansion member.

Figure 1:
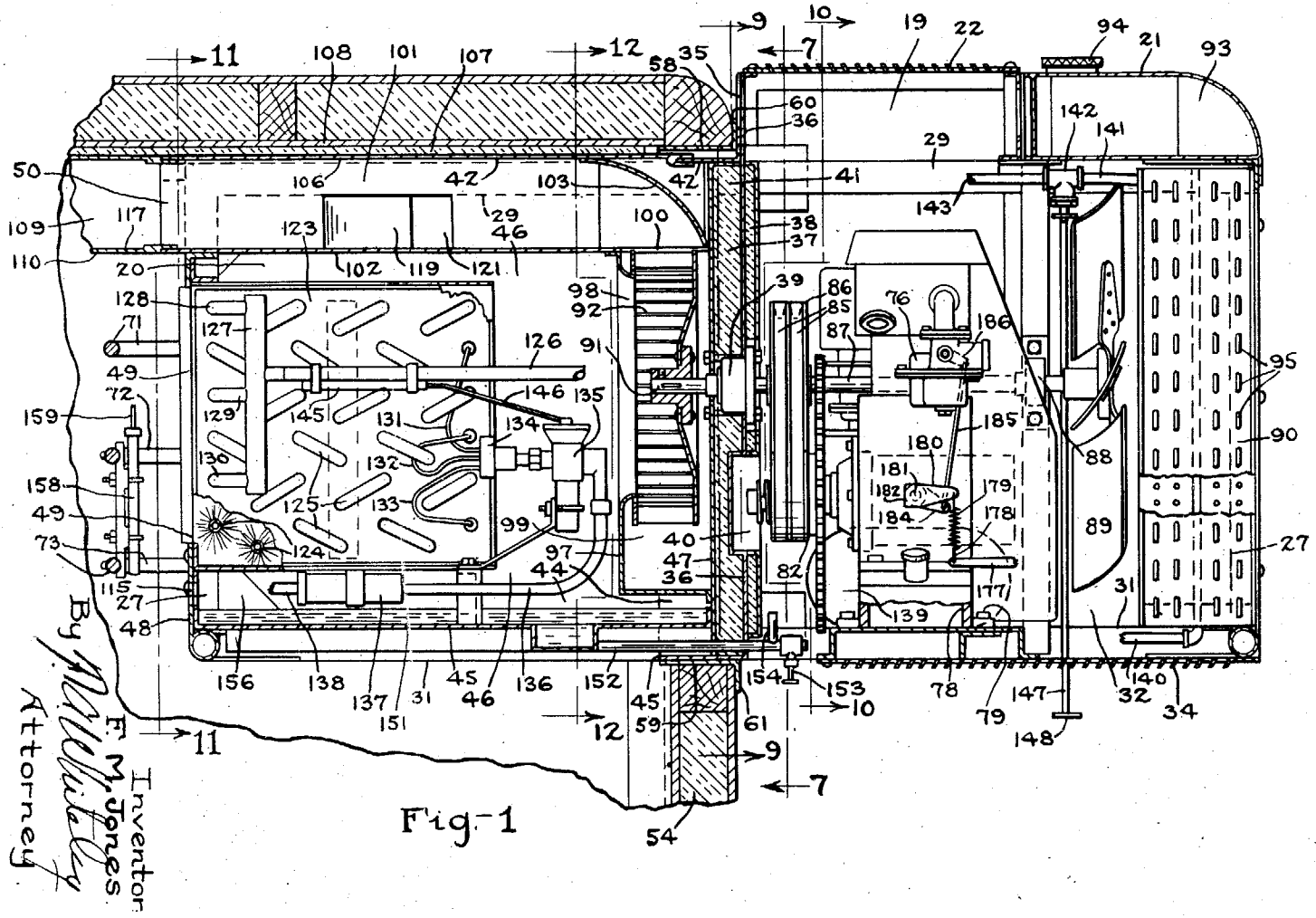
Fig. 1 is a side sectional elevation view through the cooling unit as the same is applied to the upper part of a food storage compartment such as that of a truck.

As illustrated, and referring first to Figs. 5 and 6, I provide a unitary interconnected casing 18 formed of a front portion 19 and a rear portion 20. The front part 19 comprises a top wall 21 which includes a top grill 22, side walls 23 and 24, Fig. 9, and a bottom wall 25. A framework for supporting the walls is provided by vertical tubular posts 26 and 27 which are united at their tops to horizontal tubular supports 28 and 29 and at their bottoms to lower horizontal tubular supports 30 and 31, as shown in Fig. 10. As shown in Figs. 1 and 9, the supports 28, 29, 30 and 31 are spaced considerably below the top of the front part 19 and inside of the side walls 23 and 24.

There is thus enclosed a front chamber 32 which in addition to the grill 22 in the top is provided with grills 33 in each side wall, Fig. 6. A grill 34 extends across the greater part of the bottom of the front part 19 and openwork indicated by holes 35 is provided in a rear wall 36, Fig. 9, all of which gives very free circulation of air throughout all parts of front chamber 32. The end wall 36, as shown in Fig. 1, extends substantially across the rear of chamber 32 and has on each side thereof insulation indicated at 37 and 38 of Fig. 1 excepting for a bearing housing 39 the use of which will be later described and a depression 40 for receiving an extension of a shaft member also referred to later.

There is thus formed an insulated wall 41, Figs. 1 and 5, which separates the chamber 32 from the part of the unit which passes through the front wall of the truck into the interior of the truck compartment. This part of the unit comprises a top wall 42, side walls 43 and 44, and a bottom wall 45, as best shown in Fig. 9, which walls are united at their corner junctions to the horizontal tubular supports 28, 29, 30 and 31 projected from the front part of the casing 19 to the rear part of the casing 20, as shown in full and dotted lines in Figs. 1 and 9. The walls 42, 43, 44 and 45 enclose a rear chamber 46 provided with an inner end wall 47, Fig. 1, which abuts the insulation 37 and wall 41 and an outer end wall 48, Fig. 1. This outer end wall has a large inlet opening indicated at 49 in Figs. 4 and 11 and an air outlet opening 50 rectangular in shape and extending across the top of wall 48.

From the above description it will appear that the unit casing encloses a front chamber 32 and a rear chamber 46 which are entirely separated one from the other and heavily insulated, as indicated at 37 and 38 of Fig. 1, and although these chambers have a substantially continuous bottom, the top, as at 36, and the sides, as shown at 51 and 52, Fig. 9, are extended a substantial distance both up and to the right and left from the limits of rear chamber 46.

The provision of these two chambers in the unitary casing is an essential and exceedingly important feature of my invention as the same is combined or applied to the food storage compartment of a transport vehicle, such as a truck or truck trailer. For, as will be pointed out in detail hereinafter, the larger front chamber will be applied to the front wall of such a compartment so that it is entirely outside of the compartment, its numerous grills and openings leading directly to atmosphere, and it will house all the heat-producing and heat-withdrawing instrumentalities of the cooling unit, such as the gas engine, the compressor and the condenser. These instrumentalities are thus positioned where the heat generated and withdrawn from within the food storage compartment will be dissipated to atmosphere and no part of it which is not usefully employed will be transmitted in any manner to the second or rear chamber of the unit casing.

This second chamber is provided with the instrumentalities for moving a current of air and cooling it as moved by contact with suitable evaporator heat exchanger means, and the casing for this chamber and the chamber itself and its contents, which may tend to cool the air, are located entirely within the food storage compartment, but positioned at the central top where practically no effective storage space is used.

The unit is applied to the front wall of the storage compartment, so that it may be readily removed, if that becomes at any time desirable, in the following manner. A rectangular opening 53 is formed in the insulated front wall 54 of the compartment. This opening has applied thereto a frame 55 which is formed with vertical side walls 56 and 57 and top wall 58 and bottom wall 59, as shown in Fig. 9, and which walls are adapted to engage the edge walls forming the opening 53 extending through the front wall of the truck. Laterally extended side flanges 51 and 52 and top and bottom flanges 60 and 61 extend from the walls 56 and 57, and 58 and 59 respectively and engage the outside of the front wall 54 of the truck.

Figure 4:
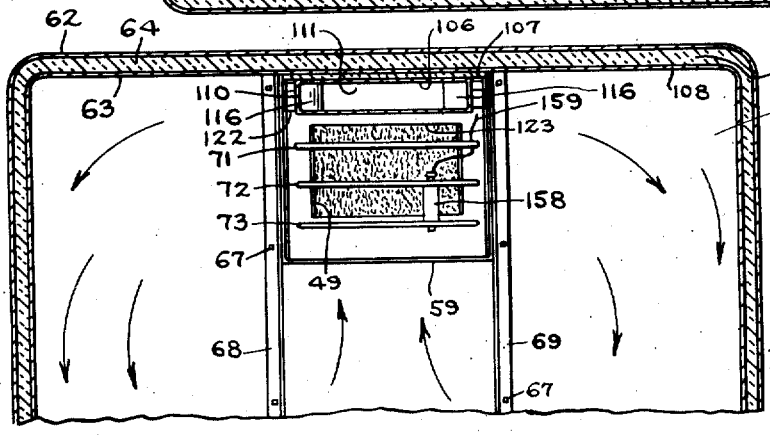
Fig. 4 is an end elevation view taken on line 4—4 of Fig. 2.

The usual construction of food transport vehicles is well shown in Fig. 5, wherein an outer shell 62 of suitable material such as metal and a similar inner shell 63 are spaced apart, the space being filled with insulation 64. After the opening 53 has been formed in the truck body vertical wooden frame members 65, 66 are positioned between the outer and inner shells 62 and 63, and may extend from the top toward the bottom downward as far as may be desired. Secured to these frame pieces 65 and 66 by means of bolts 67 are angle irons 68 and 69. The bolts 67 also pass through bracket flanges 70 fast on the tubular members 29 and 31, as shown in detail in Figs. 7 and 8, and by this means the entire unit is held rigidly assembled in the front wall 54 of the food storage compartment and yet so assembled that by merely removing the bolts 67 the unit may be withdrawn therefrom. Brace rods 71, 72 and 73 extend in arched relation across the rear wall of the unit, as shown in Figs. 1, 4 and 6 and hold the parts rigidly together.

Having reference particularly to Figs. 1, 10 and 13, within the front chamber 32 and transversely in alinement are a gas engine 75, a carburetor 76 therefor and a compressor 77. A support for the engine is indicated at 78 of Fig. 10 as being secured by bolts 79 to bracket plates supported by tubular supporting members 25 and 30. Similarly a support 80 for the compressor 77 is supported upon tubes 25 and 31.

Fast on motor shaft 81 is a pulley 82 which drives a pulley 83 operating the compressor shaft 84, Fig. 10, by means of a belt 85. Belt 85 also passes over a pulley 86 on fan shaft 87. The fan shaft 87, as clearly shown in Fig. 1, has its forward end extended through a supporting bearing 88 and carries a fan 89 located in front chamber 32 directly in front of the air passages through condenser 90. The shaft 87 continues through bearing 39 heretofore described and has a portion 91 which extends into the rear chamber 46 and has secured thereto a blower 92. Above the condenser 90 is a gasoline tank 93 adapted to be filled through an opening closed by cap 94. The condenser 90 is of standard construction embodying a multiplicity of coils 95 and an opening for air movement into chamber 32 through and about the condenser coil.

Also the condenser 90, as clearly shown in Fig. 1, is at the front end of front chamber 32 projected forwardly of the truck at the upper part thereof, where the pressure of the air as the truck moves along the highway will aid the fan 89 in drawing air through the condenser. This air also is free to circulate all about the engine 75 and the compressor 77 and leave in practically all directions through the numerous openings 22, 33, 34 and 35 provided for that purpose. Because of this freedom of air to move out of compartment 32 directly into the open air in all directions, it will be apparent that, when cooling of the compartment takes place, none of the heat released by the gas engine, the compressor and the condenser, will affect the walls 54 of the food storage compartment 96 within the truck, or tend to warm the food storage compartment therein.

Figure 12:
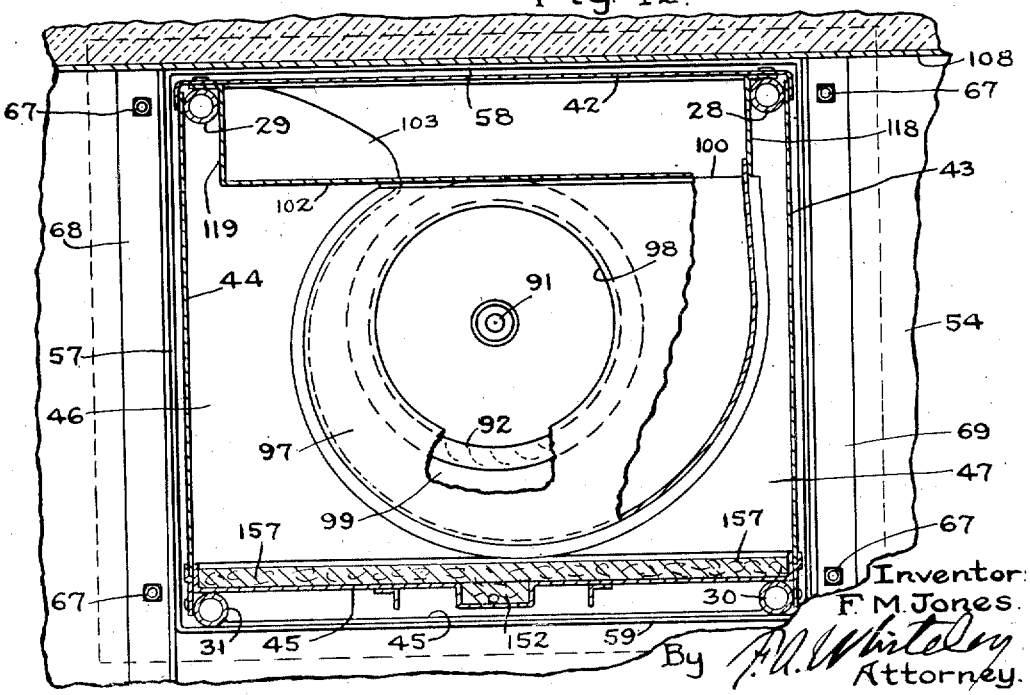
Fig. 12 is a sectional transverse view taken on line 12—12 of Fig. 1.

The blower 92 within front compartment 46 has a housing formed in the back by the closure 47 and in front by a typical blower casing 97 shown in outline in Fig. 12. The casing 97 is formed with a central opening 98 and with an internal passageway 99 surrounding the casing and the blower 92 which progressively expands in width, as shown in Fig. 12, to the discharge outlet 100 into a top passageway 101 within a casing 102 leading to the air outlet opening 50 from the inner casing portion of the complete cooling unit. A curved top wall 103, Fig. 1, aids in directing the air moved by blower 92 to and through the passageway 101.

The passageway 101 and the casing 102 have their top wall 106 in engagement with a lining member 107 between the top wall 106 and the inner wall 108 of the top of the compartment. This passageway 101 is extended into a passageway 109 formed by a rectangular casing 110, Figs. 2 and 4, which extends along the central top of the food compartment 96 directly in contact with the liner 107.

Figure 2:
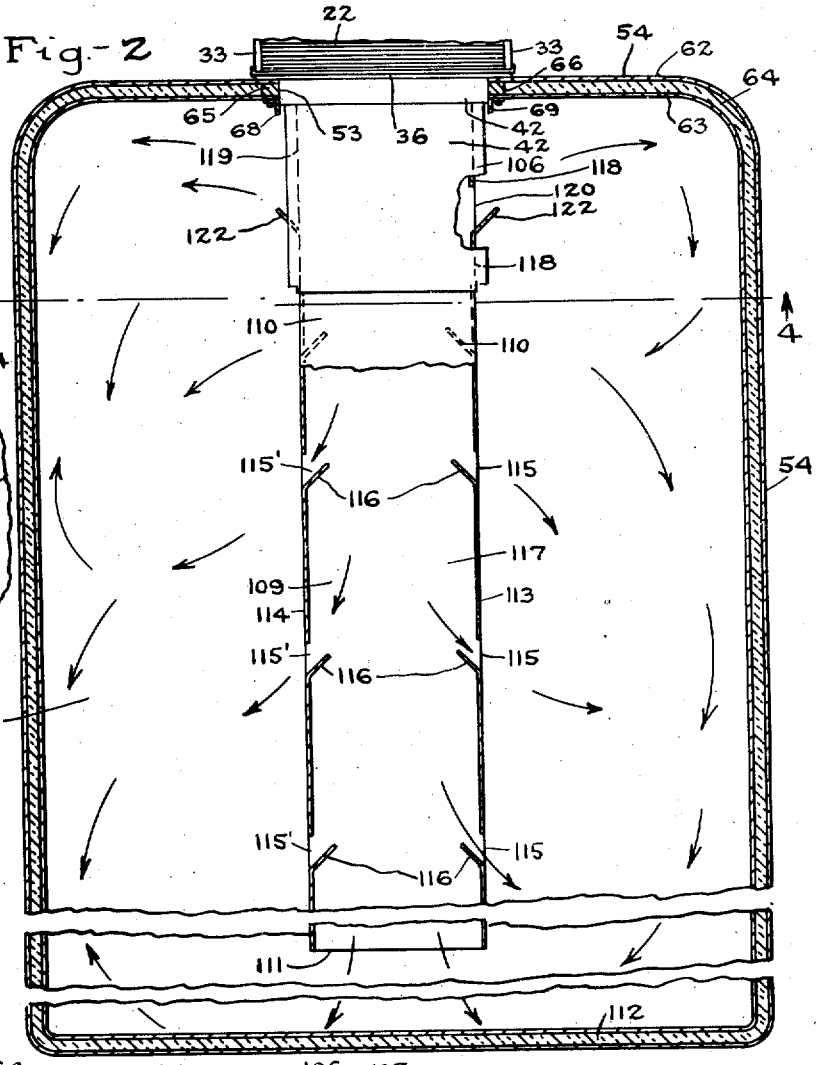
Fig. 2 is a plan view with some parts in section and with the food compartment top removed to show that part of my cooling mechanism found on the inside of the food compartment.
Figure 3:
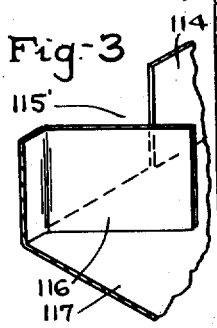
Fig. 3 is a perspective detail view showing the forms of opening employed for leading air out of the main air trunk.

As shown at 111, Fig. 2, the end of the duct passageway 109 approaches the rear wall 112 of the food storage compartment 96. The duct passageway 109 has formed in its side walls 113 and 114 a series of openings 115 and 115'. These openings are specifically of the form indicated in Fig. 3, wherein a lip 116 is pressed inwardly between the top wall of casing 110 and the bottom wall 117. There also are formed in the side walls 118 and 119 of the top duct 101, Fig. 1, similar openings 120, Fig. 2, and 121, Fig. 1, only the lips 22, Fig. 2, are pressed outwardly and backwardly.

The arrangement of the several ducts 115, 115' and of ducts 120 and 121 is such as to cause a sheet of cooled air to flow from the central duct 117 outwardly along the top of the food storage compartment and to move against all of the four surrounding walls of the compartment, thence downwardly along said walls to the floor of the compartment, as clearly shown in Figs. 2 and 4, with the result that an envelope of cooled air is caused to be formed and to move along all interior walls of the food storage compartment.

This is the outward action of the blower. The inward or suction action of the blower causes air to move through an evaporator heat exchanger 123 formed of a series of transverse pipes 124 connected by pipe coils or unions 125 at the sides, as shown in Fig. 1. The opening 49 to the evaporator heat exchanger 123 is well shown in Fig. 11. The suction of blower 92 causes the air to move through the opening 49 underneath the outlet duct passageways 101 and 117 and thence through to the opening 98 into the blower casing and through the blower 92 and back into the ducts 101 and 117.

As shown in Fig. 4, the result of this operation is to draw into the blower and through the opening 123 air toward the top of the surrounding wall-contacting envelope of cooled air. This, of course, will always be the warmest air in the food storage chamber 96; and because all of the walls within the food storage chamber are wiped by the moving envelope of cooled air which constantly takes up any heat tending to enter the food storage compartment through the walls, channeling of air currents and pocketing and resulting dead air spaces are entirely avoided. Perfectly uniform cooling of the entire food storage chamber and all of its contents at a minimum of cost results.

The arrangement of piping for conveying the compressed fluid to the evaporator is shown in the diagram, Fig. 13. In normal refrigerating operation the compressed fluid leaves the compressor cylinders to a manifold 144 and from there goes through a pipe 143 past a three-way valve 142, and through a pipe 141 into the condenser 90. From the condenser 90 the liquid fluid goes through pipe 140 to receiving tank 139. From receiving tank 139 a pipe 138 passes through the separating wall 36 and to and through a dehydrator 137. From the dehydrator 137 the liquid fluid passes through a pipe 136 and an expansion valve 135 and enters the manifold head 134, from which the liquid passes through capillary tubes 131, 132 and 133 (see Fig. 1), to the coils and different pipes of the evaporator heat exchanger 123. The return flow of the gas goes through pipes 128, 129 and 130 to a manifold 127 (Fig. 1), and thence through pipe 126 to manifold 77' and from there back to the compressor.

The expansion valve 135, of usual construction, is controlled by a gas pressure thermostat 145 held in contact with suction gas return pipe 126, Figs. 1 and 13. Gas pressure from thermostat 145 goes through tube 146 to expansion valve 135 and regulates the rate of flow of fluid to and through the evaporator heat exchanger 123.

The above is a standard and usual circuit for carrying out the refrigerating cycle.

For effecting heating of the heat exchanger 123 for defrosting and transferring heat to the compartment by the same air-moving means as circulates that air from the compartment through the heat exchanger for withdrawing heat, I have provided the following simple arrangement.

The valve 142 may be an ordinary three-way valve in a casing to which opens a pipe 149, Fig. 13. This valve 142 is provided with stem 147 and hand-piece 148 extending below the bottom wall of the front part of the casing 19 to a position where it can be conveniently operated by the truck driver, as shown in Fig. 1. This hand-piece is employed for the purpose of shifting the three-way valve to either of two positions. For the refrigerating cycle it will close communication with pipe 149 and direct the gas only to the condenser 90. In its second position it will open communication to pipe 149 through which the hot gas from the compressor will go through manifold 150 to the coils of the evaporator heat exchanger, from which the hot gas is returned to manifold 127, Fig. 1, and goes through pipe 126 and manifold 77' back to the compressor.

As shown in Fig. 13, this is the shortest direct route, and by-passes the parts connected with pipe 140, although still connected with condenser 90, passing the hot gas through the evaporator heat exchanger 123 where its heat may do useful work either in melting the frost on the coils to effect defrosting, or in being transferred by the air circulating means to the compartment to warm the same.

In the operation above described for the normal cooling cycle the evaporator is a cooling heat exchanger and the condenser a heat exchanger for giving off heat and dissipating it to atmosphere. That is, the air drawn through the evaporator heat exchanger by the blower back of it is cooled air and cools the compartment. In the reverse operation the air travelling as above described, drawn through the evaporator heat exchanger by the blower 92, will be heated air, which, if driven into the compartment for any considerable time, of course, would result in heating it.

When the direction of flow is at last described it may after the evaporator has been used for cooling air cause defrosting of the evaporator coils. The water released from said defrosting action will fall in a pan 151, Fig. 1, from which it may be withdrawn through a pipe 152 which discharges outside of the truck below the forward part 19 of the casing and which is controlled by a valve 153. In practice the valve 153 will be closed and water retained or introduced in pan 151 until it reaches the level of a branch pipe 154, Fig. 1, when it will overflow outdoors.

Figure 11:
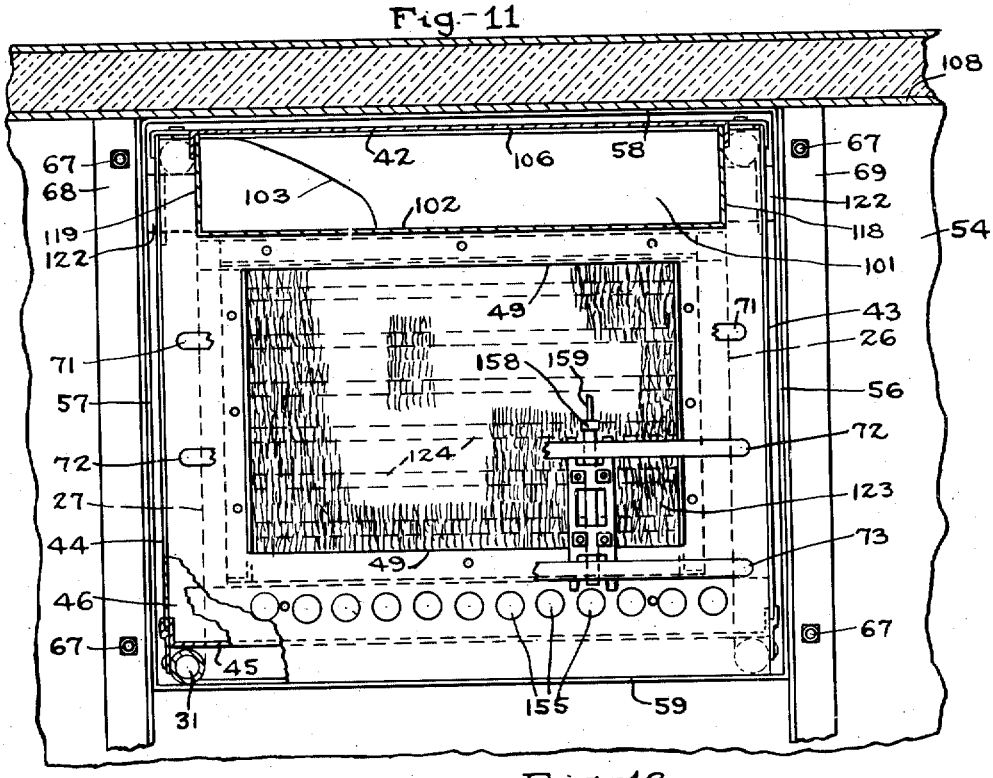
Fig. 11 is a sectional transverse view taken on line 11—11 of Fig. 1.

The purpose of retaining the water in pan 151 is to permit evaporation to maintain a humid atmosphere within the food storage compartment 96. As shown in Fig. 11, a series of openings 155 in rear casing wall 48 leads to the space 156 above the rear part of pan 151. In practice masses of capillary material, such as mineral wool, indicated at 157 of Fig. 12, will be put in pan 151 both to increase the evaporating surface in the pan and to hold the water therein against any substantial movement due to the operation of the truck. By these means the return air from the food storage compartment 96 will take up moisture from the large exposed surface in pan 151 with the result that the interior of the food storage compartment will have an atmosphere substantially moisture-saturated, which is of great value in transporting certain types of food stuffs, such as meats, vegetables, fruits and the like.

From gas tank 93 gasoline is fed to carburetor 76 in a customary manner. The carburetor, however, is adapted to be held in one or the other of two positions for developing two speeds of the engine, an idling speed, which effects practically no compressing action when cooling is not required, and a high speed for compressing and cooling. The means for effecting this operation are shown in detail in Figs. 1, 13, 14, 15 and 16. These means are as follows:

A fluid expansion thermostat 158, Figs. 1 and 4, is connected by a tube 159 with a sealed chamber 160 within a casing 161 depending from a second casing 162. Within the chamber 160, and forming with said chamber a fluid pressure responsive member, is a shell 163 formed of a series of convolutions, as indicated at 164 of Fig. 16. The space 165 within the member 163 is open at its top, as indicated at 166, Fig. 16, and further opens at 167, Fig. 14, through the casing 162 and into a chamber 168 within said casing.

In this casing 162 is pivotally mounted at 169 a frame 170 which carries an upstanding arm 171 having on its end an armature 172 facing a magnet 173. Extending horizontally is a second arm 174 which is guided by a pin 175 extending through a slot in its end. And extending through a slot 176 in the rear wall of casing 162 and secured to frame piece 170 is a long lever arm 177.

The arm 177 is connected at its end through a link 178 formed in part as a spring 179 with the end of a lever 180, as clearly shown in Figs. 1 and 14. Arm 180 in turn is connected with a pivoted piece 182, as shown in Fig. 1. The pivoted piece 182 is mounted at 183 upon the casing of motor 75, as clearly shown in Fig. 10. Fast on the inner end of piece 182 is a lever 184 which is connected by means of a link 185 with the throttle lever indicated in dotted lines at 186 on Fig. 1.

Mounted upon the base 187 of shell 163 is a plunger 188, Fig. 14, which has a pointed head 189 engaging the interior of a hemispherical-shaped member 190 on horizontal lever arm 174. Over member 190 rests a corresponding depression in a cap 191. Seated in this cap is a compression spring 192, the other end of which engages a cap 193 similar to cap 191. The cap 193 carries a pointer 194 the end 194' of which is adapted to move along a plate 199 in a slot 200, Fig. 15. A thumb screw 197 has its shank 196 threaded into cap 193 by means of which the degree of pressure exercised by the spring 192 may be varied as desired. A rack mechanism 198 holds the screw shank 196 in any adjusted position. The pointer end 194' indicates the temperature at which the control will operate.

The cover 201 is removably held in position by means of a thumb screw 202.

A screw 203 threaded through a bracket 204 insulated from the frame has its end engaging the armature arm 171. By adjusting this screw the armature 172 may have its face moved to positions of less or greater distance from magnet 173, whereby the force of the magnet upon armature 172 may be correspondingly varied.

From the above description the operation of the construction may be understood as follows: The carburetor is fed in a well-known way by a tube 210 extending from the gas tank 93 to the float chamber 211. Under normal conditions when the air conditioning mechanism is first set in operation the interior of the food compartment will be relatively warm, so that the fluid pressure responsive member 163 will be contracted to bring armature 172 within the operative force of magnet 173. This results in putting the carburetor throttle in its position to operate the engine at desired compressing speed, and takes place when the temperature within the food storage chamber 96 is above the desired minimum.

As the temperature falls the gas in expansion thermostat 158 will contract, and gas pressure in the chamber 160 will fall, thus permitting element 163 to expand until the pressure of spring 192 is sufficient to overcome the pull of magnet 173 on armature 172. This will permit the spring to rock the frame 170 on the pivot 169 and correspondingly rock arm 177, tending to close the throttle. As the closing of the throttle continues the speed of the gas engine will progressively decrease, having less and less compressing and cooling effect as the temperature within the food storage chamber 96 progressively falls. And when this temperature reaches the desired minimum the spring 192 will have rocked frame 170 and lever 177 and have operated the throttle to a point at or substantially at the limit of predetermined possible movement of arm 174 along guide pin 175, putting the motor into merely idling speed.

When during the cooling cycle the temperature for any cause rises within the food storage compartment the fluid in expansion thermostat 158 will expand and put increased pressure in chamber 160, which will result in contracting or compressing the fluid pressure responsive member 163 to cause it to move frame 170 and connected levers 171 and 177, first to bring the armature 172 nearer to the magnet 173 and then, if the temperature rise has been sufficient, to bring the armature to a point where the pull of the magnet snaps the arm 171 against the end of adjusting screw 203. This again will move the throttle to effect full speed of the motor.

It will be noted that the fluid pressure responsive member 158 is located directly in front and toward the bottom of the opening 49 leading from food-storage chamber 96 into the inner chamber 46 of the casing and toward the bottom thereof thus being directly within the stream of return air going to the evaporator cooling coils. The temperature control of operation of the motor is therefore based upon temperature of return air, which is substantially the warmest air within the food storage compartment. This insures not only a uniform operation of temperature shifts but also that the temperature shifts are based upon the warmest air within the food storage compartment and hence cannot leave unduly warm portions of air within the food storage compartment at any place or any time during the operation of the device.

The advantages of my invention have been given in considerable detail in the specification hereinbefore recited. Fundamentally there are six primary advantages.

First, the cooling unit is entirely self-contained, all parts of it are mounted and connected together within a single unitary casing. There are no connecting elements running out of the casing to other instrumentalities.

Second, this casing embodies two chambers separated and thoroughly insulated from one another. One of said chambers holds and encloses power, compressor and condenser means. The other chamber contains the evaporator heat exchanger, that is, the means for withdrawing heat from the compartment. In both chambers there are independent air moving means, that in the front chamber for forcing the withdrawn heat out of the system and that in the rear chamber for drawing the air through the evaporator heat exchanger and forcing the cooled air into and through the food storage chamber.

Third, the casing is mounted in the front wall of the food storage compartment, such as is found in a truck or trailer at the top thereof, with the heat-releasing chamber outside where its numerous openings permit quick discharge of all released heat to atmosphere, and with its cooling chamber entirely inside the food compartment for causing cooling and circulating of the cooled air therein.

Fourth, my invention provides means for distributing the cold air within the compartment wherein an envelope of said cooled air is caused to move along all walls of the food storage chamber and the return of air to the unit is taken from within and toward the top of this surrounding envelope, thus at all times withdrawing the warmest air from within the compartment and effectively preventing any pocketing, dead air spaces, or regions of insufficient cooling.

Fifth, a highly important and novel control of the motor is effected by means of an expansion thermostat exposed to the return current of air whereby the carburetor is actuated to effect operation of the motor at a low or idling speed at which the fans or blowers will be sufficiently operated to maintain movement of air in and from both chambers of the cooling unit at reduced rates of movement, and whereby the motor is operated at a higher speed producing rapid movement of air in and from the unit chambers and thus effecting suitably rapid cooling where that is called for.

Sixth, simple hand operative means is provided for changing flow of hot gas from the compressor to and through the heat-exchanger by means of a shortened circuit for the main stream of gas, which still is connected with the condenser. This shortened circuit otherwise bypasses the receiving tank, expansion valve and dehydrator, and goes directly to and through the heat-exchanger and back to the compressor. What was the evaporator heat exchanger thus becomes a heating heat exchanger which can heat the air going through it to warm the compartment, or can merely melt ice on the heat exchanger for defrosting, the water from such defrosting going to a pan preferably containing rock wool or other material so the air drawn over it by the blower will take up the water and keep a high degree of humidity in all the air in the compartment.

A final and very material advantage of my invention resides in the fact that it is both relatively cheap to construct and install, is operated economically and maintains itself in operation with a minimum of adjustment and repair.

I claim:

1. In combination with a food storage compartment such as the compartment of a transport vehicle having walls exposed to outside atmosphere, including a front wall having an opening therethrough, a cooling unit comprising a single unitary casing the walls of which form two chambers, an evaporator heat exchanger secured to the casing in one chamber, air moving means in said one chamber, a compressor and air-moving means and a gas engine for operating the compressor and both air-moving means secured to the casing in the other chamber, the casing of the evaporator-containing chamber and said opening being relatively of a shape and size such that said casing part may fit inside and be projected through the opening to be within the compartment and the other chamber be outside the compartment and its walls exposed to outside air, means in the casing supporting the first mentioned air moving means and forming the dividing partition of said chambers for insulating them one from the other, and means for securing said casing and parts carried thereby on said front wall so that the casing as an entirety and all parts of the cooling unit may be readily removed therefrom as an entirety.

2. In combination with a food storage compartment such as the compartment of a transport vehicle having walls exposed to outside atmosphere including a front wall having an opening therethrough, a cooling unit comprising a single unitary casing the walls of which form two chambers, an evaporator heat exchanger secured to the casing in one chamber, air moving means in said one chamber, a compressor and air-moving means secured to the casing in the other chamber, a gas engine secured to the casing in said last-named chamber for operating the compressor and both air-moving means, the casing of the evaporator-containing chamber and said opening being relatively of a shape and size such that said casing part may fit inside and be projected through the opening to be within the compartment and the other chamber be outside the compartment and exposed to outside air, means supporting the first mentioned air moving means and forming the dividing partition of said chambers for insulating them one from the other, means for securing said casing and parts carried thereby on said front wall so that the casing as an entirety may be readily removed therefrom, and means on the casing portion within the compartment controlled by the temperature therein for controlling operation of the gas engine according to the temperature change demands made upon the instrumentalities operated by the gas engine.

3. In combination with a food storage compartment such as the compartment of a transport vehicle having walls exposed to outside atmosphere, including a front wall having an opening therethrough, a cooling unit comprising a single unitary casing the walls of which form two chambers, one of said chambers being larger in cross-sectional area than the other with part of its walls at the point of junction with the walls of the smaller chamber extending outwardly therefrom, an evaporator heat exchanger secured to the casing in the smaller chamber, air moving means in said smaller chamber, a compressor and air-moving means and a gas engine for operating the compressor and both air-moving means secured to the casing in the larger chamber, the construction of the casing adapting the part thereof enclosing the smaller chamber to be projected through said opening so that said smaller chamber may be within the compartment and the larger chamber outside the compartment and its walls exposed to outside air, means in the casing supporting the first mentioned air moving means and forming the dividing partition of said chambers for insulating them one from the other, and means for securing said casing and parts carried thereby on said front wall so that the casing as an entirety and all parts of the cooling unit may be readily removed therefrom as an entirety.

4. Means for air-conditioning a closed compartment such as the compartment of a transport vehicle, said means comprising a casing, refrigerating apparatus therein including an evaporator, part of said casing including an encased chamber having said evaporator therein and having an air inlet opening and an air outlet opening, means for causing a current of air to be conditioned to move through said inlet, across said evaporator and discharging it through said outlet, a gas engine mounted in the casing for operating said refrigerating apparatus and said air moving means, an expansion thermostat positioned to be traversed by said current at the air inlet opening, means for controlling operation of said gas engine, and means caused to be operated by said expansion thermostat for causing said controlling means to effect control of operation of the gas engine in response to changes of temperature of said current of air.

FREDERICK M. JONES.

REFERENCES CITED

The following references are of record in the file of this patent:

UNITED STATES PATENTS

| Number | Name | Date |
|---|---|---|
| 1,943,965 | Hulse | Jan. 16, 1934 |
| 2,056,353 | Hainz | Oct. 6, 1936 |
| 2,162,152 | Wulle | June 13, 1939 |
| 2,180,915 | Stebbins | Nov. 21, 1939 |
| 2,206,631 | Clark | July 2, 1940 |
| 2,229,220 | Parks | Jan. 21, 1941 |
| 2,231,069 | Harris | Feb. 11, 1941 |
| 2,257,221 | Bell | Sept. 20, 1941 |
| 2,263,476 | Sunday | Nov. 18, 1941 |
| 2,266,187 | Fitzgerald | Dec. 16, 1941 |